May 20, 1952 H. A. STAMPER ET AL 2,597,199
ECHO DISTANCE MEASURING APPARATUS
Filed May 25, 1948 3 Sheets-Sheet 1

INVENTORS
H. A. STAMPER
D. O. NELSON
J. A. WIPPERT
BY
ATTORNEY

May 20, 1952 H. A. STAMPER ET AL 2,597,199
ECHO DISTANCE MEASURING APPARATUS
Filed May 25, 1948 3 Sheets-Sheet 2

INVENTORS
H. A. STAMPER
D. O. NELSON
J. A. WIPPERT
BY Elwoodbury
ATTORNEY

INVENTORS
H. A. STAMPER
D. O. NELSON
J. A. WIPPERT
BY
ATTORNEY

Patented May 20, 1952

2,597,199

UNITED STATES PATENT OFFICE 2,597,199

ECHO DISTANCE MEASURING APPARATUS

Hamilton A. Stamper and Donald O. Nelson, Los Angeles, and James A. Wippert, Burbank, Calif., assignors to Bendix Aviation Corporation, South Bend, Ind., a corporation of Delaware Application May 25, 1948, Serial No. 29,146

13 Claims. (Cl. 177—386)

This invention relates to distance measuring by reflected traveling waves, and relates more particularly to apparatus that makes a continuous record of the distance. Such apparatus is most commonly used on boats and ships to measure the depth of water, under which conditions it is called a depth recorder.

An object of the invention is to simplify, reduce the weight and cost, and increase the utility of echo distance recorders.

A more specific object is to simplify the scanning and triggering mechanism of an echo distance recorder.

Another object is to provide an undistorted record in which distances are measured on a straight line instead of on an arcuate line.

Another object is to simplify and increase the efficiency of an electric circuit for the generation and reception of electric waves in echo distance measurements.

Other more specific objects and features of the invention will become apparent from the description to follow.

Prior depth recorders have employed rotating structures for revolving a stylus across the record paper. This necessitated the measurement of the depth along an arc on the paper, and required a relatively heavy and expensive rotating structure to carry the stylus, which structure sometimes interfered with the view of the record. Others had considered elimination of a rotating stylus carrier and using a belt to carry the stylus in a straight path across the record paper. However, such arrangements as have heretofore been proposed were impracticable for various reasons, chief of which were belt breakage and belt slippage. Belt breakage was a problem because it was considered necessary to use metal belts in order to complete electrical connection to the stylus. Slippage could not be tolerated in the prior apparatus because it threw the stylus out of synchronism with the contact or commutator mechanism that timed the transmission of the sonic impulses.

In accordance with the present invention, a belt-borne stylus is employed without incurring the mentioned difficulties. A stylus and cooperating contact structure of novel design eliminates the need of a conductive belt, so that a long lived, fabric or rubber belt can be employed. What is more important, however, is that the stylus and cooperating contact structure controls directly the transmission of the sonic impulse, so that there is no separate switch or commutator to get out of synchronism with the stylus in case of belt slippage. Because of the absence of separate switches or commutators, and gears for driving them in synchronism with the stylus, together with the substitution of a light belt and pulleys for the former heavy rotating stylus carrier, a relatively small, light and inexpensive driving motor can be employed.

Further in accordance with the present invention, high efficiency and simplicity are obtained in the generation of the sonic impulses by employing a shock-excited oscillatory circuit consisting of a high Q inductance element mounted in the recorder case and tuned by the inherent capacity of a remotely located piezo crystal transducer and the inherent capacity of the connecting cable. Heretofore it has been the practice to locate the inductance element in the transducer case, under which condition it was difficult to employ an inductance having a high Q.

Other novel features of the invention will appear from the following detailed description.

Figure 1:
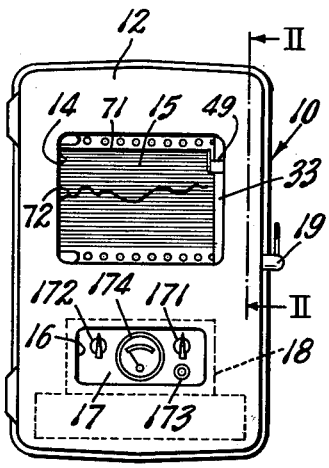
Fig. 1 is a front elevation of the recorder case of a depth recorder in accordance with the invention.

Referring first to Fig. 1, the depth recorder therein depicted comprises a control box or recorder casing 10 consisting of a rear stationary portion 11 (Fig. 2) and a front hinged cover portion 12 which is adapted to be sealed with the portion 11 by a rubber gasket 13. The casing cover 12 has a window 14 through which the paper record 15 is visible. The lower portion of the cover 12 contains an opening 16 through which a control panel 17 on the electronic unit 18 projects. This panel 17 may contain a gain control knob 171, an illumination control knob 172, an "on" and "off" switch 173, and a line voltage voltmeter 174. A fastener 19 may be provided to secure the cover in closed position.

Figure 4:
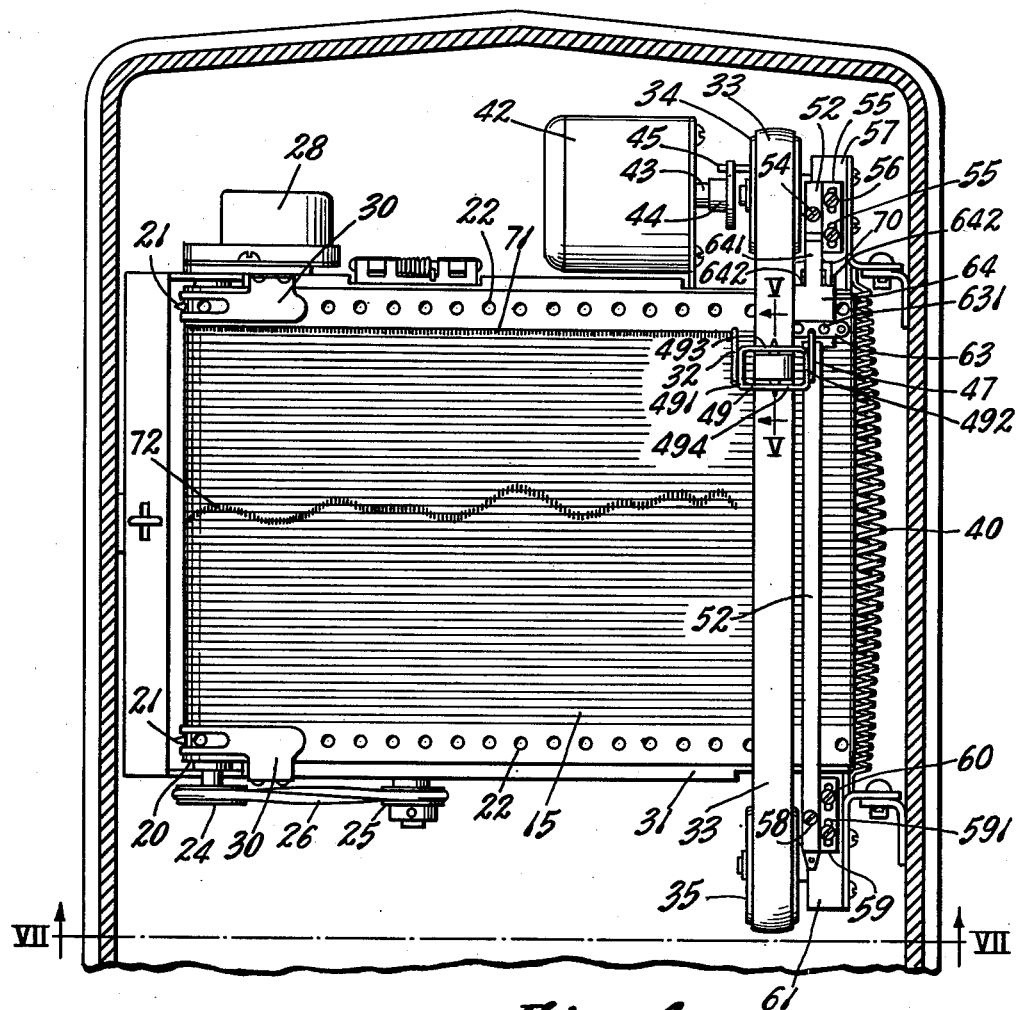
Fig. 4 is a vertical section taken in the plane IV—IV of Fig. 2.
Figures 5, 6:
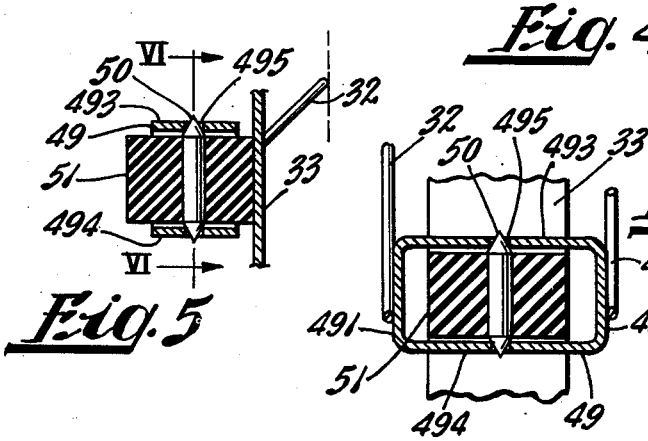
Fig. 5 is a detail vertical section taken in the plane V—V of Fig. 4.
Fig. 6 is a detail vertical section taken in the plane VI—VI of Fig. 5.
Figure 7:
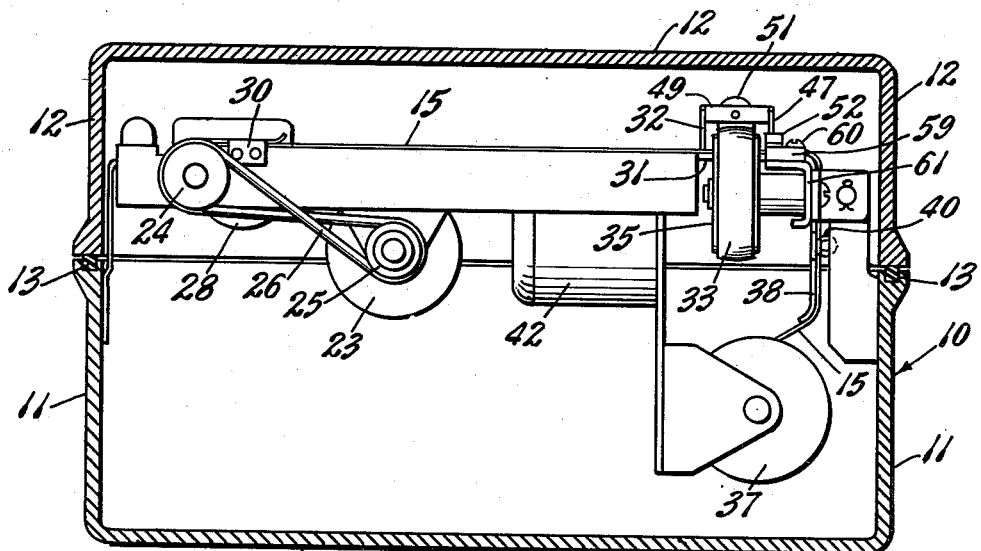
Fig. 7 is a horizontal section taken in the plane VII—VII of Fig. 4.

Referring to Fig. 4, the record member or paper 15 is moved slowly from right to left by a drive roller 20 having sprockets 21 thereon which engage marginal sprocket holes 22 in the paper. After passing around the roller 20, the paper 15 is wound around a take-up roller 23 (Fig. 7) which take-up roller is driven from the roller 20 by pulleys 24 and 25 and a crossed belt 26. The roller 20 is driven at constant speed by a small electric motor 28 which may be of the synchronous clock type containing reduction gearing incorporated therein. The paper may be held positively in engagement with the roller 20 at opposite ends thereof by guide clips 30.

The record paper 15 may be of various types, but it is convenient to employ a type of paper that produces a mark in response to an electrical discharge therethrough. Hence the desired markings can be produced on the paper by applying a suitable potential between the backing plate 31 over which the paper rides, and a wire stylus 32 that is dragged across the paper at recurrent intervals at a constant speed. In accordance with the invention, the stylus 32 is carried by a belt 33 which is supported by two pulleys 34 and 35, so that the stylus moves downwardly across the paper and returns upwardly back of the paper. Details of the mounting of the stylus on the belt and its operation to produce the record will be described later.

The record paper is fed from a feed roller 37 (Fig. 7) and flows forwardly over a guide plate 38 to the edge of the backing plate 31, which may be formed continuously with the plate 38. To maintain a proper tension in the paper 15 so that it will lie flat against the plate 31, a tensioning device may be employed which consists of an approximate helical tension spring 40 which is supported above and below the paper on the plate 38. As is best shown in Fig. 4, this spring 40 is tapered from a small diameter at each end to a larger diameter at the middle, so that each turn of the spring bears against the paper with approximate equal force.

As previously indicated, the belt 33 is stretched over two pulleys 34 and 35, the pulley 34 being a drive pulley, and the pulley 35 being an idler pulley. The pulley 34 is shown coupled to an electric motor 42, the drive shaft 43 of which is coaxial with the pulley 34. The driving coupling between the motor shaft 43 and the pulley 34 is shown as consisting of a hub 44 on the motor shaft having a radial slot therein which engages a crank pin 45 projecting from the pulley 34. Both pulleys are rotatably supported on stub shafts which are in turn supported at their right ends from the frame of the machine.

As previously indicated, the belt 33 does not need to be electrically conductive, and hence may be made from pliant, non-metallic material, such as rubberized fabric, which has little frictional resistance to bending, and has a long life.

The stylus 32 and a complementary wire brush 47 are secured as by soldering to opposite sides 491 and 492 of a rectangular metal frame 49 constituting a stylus carriage. The other two sides 493 and 494 of this frame 49 have pivot apertures 495 therein which are engaged by conical ends of a pivot bar 50, the mid portion of which is imbedded in a block 51 of rubber or the like, which is secured, as by vulcanizing, to the belt 33. The block 51 is preferably of relatively soft, flexible material so that it can distort to conform to the curvature of the pulleys 34 and 35 as it passes therearound. It is also found desirable to preshape the surface of the block 51 that engages the belt 33 to conform to the curvature of the pulleys.

The structure including the pivot bar 50 and the frame 49 constitutes a light-weight support for the stylus 32 and brush 47 that rocks as necessary to retain the stylus 32 against the paper and retain the brush 47 against its cooperating parts (to be described). The frame 49 can be easily and quickly removed from the pivot bar 50 by simply squeezing the sides 491 and 492 between the fingers, which causes the sides 493 and 494 to bow apart out of engagement with the ends of the pivot bar. Another stylus-bearing frame can be substituted by simply reversing the operation.

The brush 47 performs two functions: (1) It serves to initiate the generation of the transmitted sonic pulse. (2) It completes electrical connection between the stylus 32 and its energizing circuit.

Thus referring to Fig. 4, during the major portion of the travel of the stylus 32 across the paper 15, the brush 47 rides along a conductive track or segment 52 which is supported at its ends from the main frame. Thus it is attached at its upper end by a screw 54 to an insulating block 55 which in turn is secured by screws 56 to a frame element 57. At its lower end, the segment 52 is connected by a screw 58 to an insulation block 59 which is secured by screws 60 to a frame element 61. To permit vertical adjustment of the segment 52, the screws 56 engage slots 551 in the insulation block 55, and the screws 60 engage vertical slots 591 in the insulation block 59.

There is mounted on but insulated from the segment 52 a starting contact or segment 63 which is momentarily electrically connected to the segment 52 by the brush 47 as the latter passes across the gap between the two, to initiate the transmitted impulse. This starting segment 63 is secured as by two rivets 631 to a thin strip of insulating material 64 which overlies the segment 52 and is secured thereto. At its lower end, the insulating strip 64 extends into a groove 522 in the segment 52 (Fig. 2) which retains the lower end of the strip. The upper end of the strip 64 is retained against the segment 52 by a bifurcate spring clip 70, the two prongs of which straddle a tongue portion 641 and engage a pair of shoulders 642. The spring clip 70 extends at its upper end between the segment 52 and the insulating block 55 which supports it, and is clamped between the segment 52 and block 55 by the screw 54.

Figure 2:
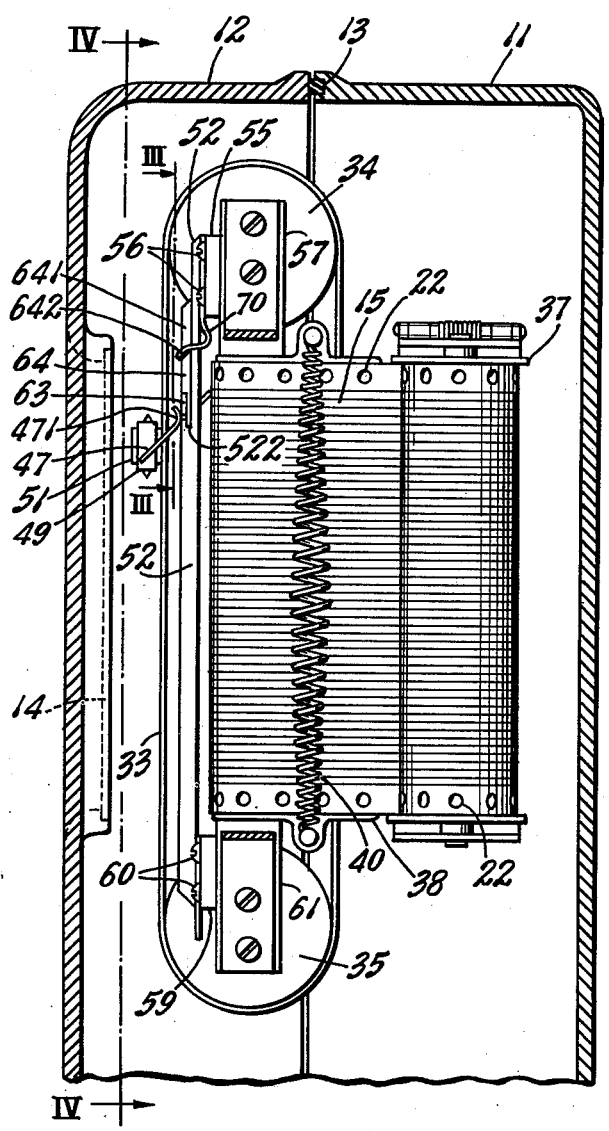
Fig. 2 is a vertical section taken in the plane II—II of Fig. 1.
Figure 3:
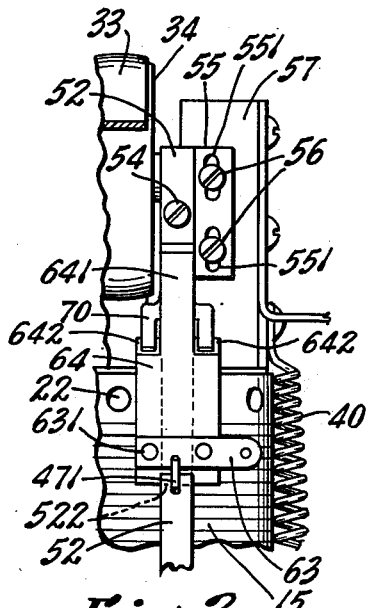
Fig. 3 is a detailed vertical section taken in the plane III—III of Fig. 2.

It will be observed from Fig. 2 that the starting segment 63 has its lower edge spaced only slightly from the adjacent part of the segment 52, and that the brush 47 has a bend 471 at its point of contact so that as it rides from the starting segment 63 onto the segment 52 it momentarily interconnects them. As will be explained later, this causes transmission of a pulse of waves. Suffice it to say at this point, that at the instant the brush 47 interconnects the contact 63 and the segment 52 a sonic wave is transmitted and an impulse is simultaneously applied through the segment 52 and through the brush 47 and the stylus frame 49 to the stylus 32, causing the latter to produce a mark 71 along the upper edge of the paper. When the echo of the transmitted pulse returns it is received and amplified and applied to the segment 52, thence through the brush 47 and frame 49 to the stylus 32, to produce another mark 72 on the paper. The distance of any mark 72 from the mark 71 is proportional to the distance of travel of the sonic wave to the point of reflection and back (usually the bottom of the water and back). The line 71 is of course a straight line, being determined solely by the position of the stylus 32 at the instant the brush 47 interconnects the segment 63 and the segment 52. Since it is this passage of the brush 47 from the segment 63 to the segment 52 that determines the time of transmission of the sonic wave, the stylus 32 must of necessity always remain in synchronism with the transmitted signal. The mark 72 is of course variable since it depends upon the distance of travel of the wave to the point of reflection.

Figure 8:
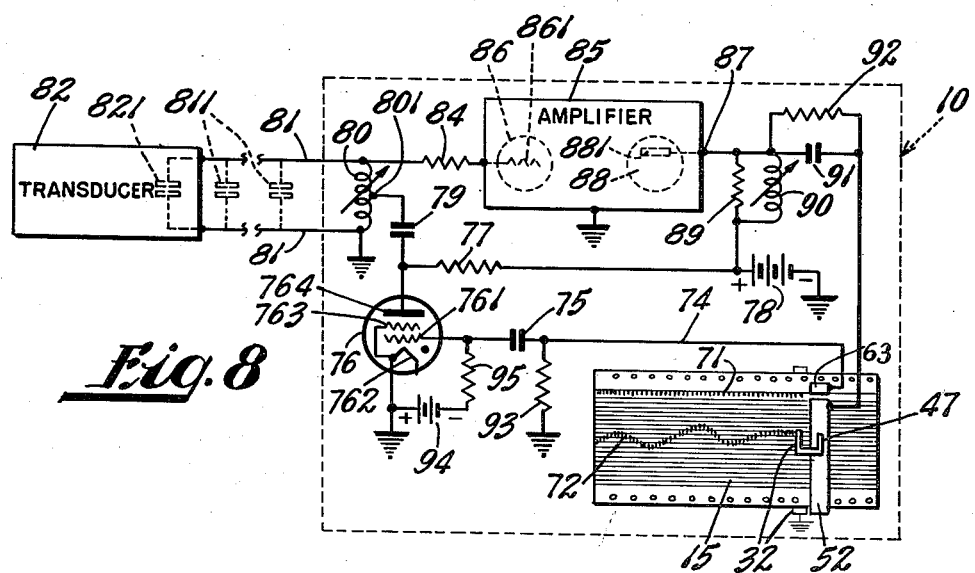
Fig. 8 is a schematic circuit diagram of the electric system of the recorder.

Referring now to the schematic circuit diagram of Fig. 8, it will be observed that the starting segment 63 is connected by a lead 74 and a condenser 75 to the control grid 761 of a thyratron 76, the cathode 762 of which is connected to ground and to a second grid 763. The anode 764 of the tube is connected through a resistor 77 to the positive terminal of a B supply 78. The anode 764 is also connected through a condenser 79 to a tap 801 on a variable inductance 80, one side of which is grounded, and which is connected by a cable 81 to a transducer 82 which is positioned remotely from the apparatus within the control box or recorder casing 10. The transducer 82 is assumed to be of a type having inherent capacity, which is indicated by the dotted-line showing of a condenser 821. Likewise the cable 81 is a type having inherent capacity, which is indicated by the dotted-line showing 811. It is these capacities 811 and 821 that tune the inductance 80 to resonance with the frequency of transmission, which may be 50,000 cycles.

Of course the total capacity of the cable 81 depends upon its length. In practice, it is often convenient to supply the apparatus with a fixed length of cable 81 which tunes with the inductance 80. If the length of cable is greater than needed, the excess cable is coiled up instead of being cut off. Slight detuning can be corrected by adjusting the inductance 80 which is of variable type, as shown. The ungrounded end of the inductance 80 is connected through a resistor 84 to the input of an amplifier 85, which may be of conventional design, the input terminal connecting to the control grid 861 of the first tube 86 of the amplifier, and the output terminal 87 connecting to the anode 881 of the last tube 88 of the amplifier. B current is supplied from the source 78 to the output terminal 87 through an inductance element 90 which is shunted by a resistor 89. The output terminal 87 is connected by a condenser 91 to the segment 52, the condenser 91 being shunted by a resistor 92. The starting segment 63 is connected to ground through a low resistor 93, which may be 1000 ohms.

The circuit operates as follows:

Normally the starting contact 63 is open, and a biasing battery 94 impresses sufficient negative bias on the grid 761 (through a grid resistor 95) to block the tube, so that no current flows between the cathode 762 and the anode 764. Under this condition, the anode 764 acquires a positive potential equal to the full potential of the B supply 78, the condenser 79 being also charged. At the instant the brush 47 simultaneously contacts the starting segment 63 and the segment 52, the full potential of the B supply 78 (to which the segment 52 has become charged while isolated from the brush 47) is applied through the starting segment 63 to the resistor 93, and the resultant pulse of current through resistor 93 (to charge condenser 91) produces a positive pulse of voltage across the resistor 93 which is applied through condenser 75 to the grid 761, causing the latter to momentarily become positive and render the tube conductive, whereupon the charge on the condenser 79 is immediately discharged through the tube 76 to the ground. This produces a surge of current in the inductance 80 between the lower end thereof and the tap 801 which shocks the tuned circuit and initiates a damped train of oscillations therein, causing the transducer to transmit a pulse of sonic waves. The oscillations are also applied to the input of the amplifier 85, amplified, and applied through the condenser 91 to the segment 52 and thence through the brush 47 and stylus 32 to produce another increment in the starting line 71 on the paper 15.

While the sonic wave is traveling to the point of reflection and returning, the stylus 32 and brush 47 travel downwardly, the brush 47 riding on the segment 52, so that the stylus 32 is at all times connected to the amplifier 85. When the echo impulse returns and is received by the transducer 82, the resultant electric wave is applied to the input of the amplifier 85 and the amplified wave produces a mark on the paper at the position occupied by the stylus 32 at that time, to produce another increment in the depth line 72. Thereafter, the system remains inactive until the brush 47 again sweeps from the segment 53 onto the segment 52, momentarily connecting the two and applying a positive impulse to the thyratron 76 to trigger the latter into action again.

It is to be noted that the pulse applied to grid 761 fires the thyratron. Condenser 79 discharges through tube 76 until tube 76 extinguishes due to low voltage. Condenser 79 discharges through resistor 77, but thyratron 76 does not fire again because grid 761 has regained its negative bias.

The resistor 84 in the input circuit of the amplifier 85 limits the amplitude of the positive impulses applied thereto at the time of transmission of an impulse, and prevents damage to grid 861 of the amplifier. The value of this resistor may be .1 megohm. The resistor 89 at the output circuit of the amplifier in shunt to the tuning inductance 90 may have a resistance of .1 megohm, so that the impedance presented to the output of the amplifier is not as greatly varied by the movement of the stylus 32 onto and off the paper. The resistor 92 has a relatively high resistance of the order of 10 megohms and its primary purpose is to discharge condenser 91 during the inactive period when the stylus is off the paper.

The resistor 93 may have a resistance of approximately 1000 ohms, which is low compared to the resistance of the paper 15.

It is particularly to be noted that, aside from the paper drive (the motor 28), which is unavoidable, the only moving parts are the belt 33 and its two supporting pulleys 34 and 35. All remote contacts, commutators, and gears synchronizing them with the stylus are eliminated. This not only reduces the initial cost of the apparatus, but makes it less liable to get out of order because of the fewer moving parts, and simplifies and reduces the expense of maintenance.

The word "sonic" as used in the specification is intended to refer to traveling waves occurring in mediums such as water, air and the like, suitable for measuring distance irrespective of whether the frequency lies within, below or above the audible range.

Although for the purpose of explaining the invention, a particular embodiment thereof has been shown and described, obvious modifications will occur to a person skilled in the art, and we do not desire to be limited to the exact details shown and described.

We claim:

1. Apparatus of the type described comprising in combination: means for generating electric waves in response to application of potential thereto; means for transmitting traveling waves in response to generation of said electric waves; means for receiving traveling waves and generating electric waves in response thereto; a member to be recorded upon; a stylus and a stylus-moving means for recurrently traversing said stylus across said member independently of received waves; means for applying electric waves generated in response to received traveling waves to said stylus for producing an indication on said record member of the position of the stylus at the time of reception of said traveling waves; a brush element on said stylus-moving means electrically connected to said stylus; first and second adjacent switch segments over which said brush element successively rides, said brush element being of such configuration as to momentarily interconnect said segments during its passage from the first to the second segment, the second segment being so dimensioned and positioned as to be traversed by said brush element while said stylus is traversing said record member; means connecting said second segment to said means for generating electric waves in response to received traveling waves and to a source of potential; and means connecting said first segment to said electric wave generating means to initiate generation of electric waves therein in response to said momentary interconnection of said segments by said brush element; said stylus-moving means comprising a stylus carriage member moving in a predetermined path traversing said record member parallel to said second segment.

2. Apparatus according to claim 1 in which said means for generating electric waves in response to received traveling waves includes a vacuum-tube amplifier having an output terminal connected to said long segment; said source of potential constituting a source of anode-potential for said amplifier.

3. Apparatus according to claim 1 in which said means for generating electric waves comprises a thermionic tube having a cathode, control grid and anode, an oscillation circuit and a source of anode potential connected to said anode, means normally negatively biasing said control grid to cut-off; and means for momentarily driving said control grid positive to render said tube conductive in response to connection of said source of potential to said first segment.

4. Apparatus according to claim 3 in which said means for momentarily driving said control grid positive comprises a condenser connected between said source of anode potential and said second segment; and a resistor of resistance large compared to the resistance of the record member shunting said condenser.

5. Apparatus according to claim 1 in which said means for generating electric waves in response to received travelling waves includes a vacuum tube amplifier having an output tube containing an anode, said record member having a resistance effective to load said amplifier when connected thereto; a source of anode potential; a tuning inductance connecting said source to said anode; means for periodically completing a circuit from said anode through said stylus and record member; and a resistor having a resistance higher than that of said record member connected in shunt to said tuning inductance for loading said amplifier when said anode circuit is not completed through said stylus and said record member.

6. Apparatus of the type described comprising, in combination: means including a control circuit for generating electric waves in response to closure of said circuit; means for transmitting travelling waves in response to generation of said electric waves; means for receiving travelling waves and generating an electric potential in response thereto; a member to be recorded upon and means for moving it in a predetermined direction; a stylus and stylus-moving means for recurrently traversing said stylus across said member independently of received waves; a driving motor for said stylus-moving means, and friction drive means coupling said motor to said stylus-moving means; means for applying the electric potential generated in response to received travelling waves to said stylus for producing an indication on said record member of the position of the stylus in its traverse at the time of reception of said travelling waves; and switching means comprising an element on said stylus-moving means and a cooperating stationary means at a predetermined point in the path of said element on said stylus-moving means for closing said control circuit in response to contact of said element with said stationary means; whereby said control circuit is closed in invariable phase relation with respect to the position of said stylus irrespective of slippage in said friction drive means.

7. Apparatus according to claim 6 in which said stylus-moving means comprises a belt and a pair of pulleys for supporting said belt with one stretch thereof traversing said record member, a block of rubberlike material on the outer surface of said belt and means mounting said stylus on said block, one of said pulleys being coupled to said driving motor and driven thereby.

8. Apparatus according to claim 7 in which the surface of said block adjacent said belt is normally concave to conform to the belt while it is bent around one of said pulleys.

9. Apparatus according to claim 6 in which said stylus moving means comprises a belt and a pair of pulleys for supporting said belt with one stretch thereof traversing said record member in front thereof and the other stretch traversing the record in rear of the record member, a carriage member on the outer surface of said belt, and means supporting said stylus on said carriage member for projection of the stylus past the belt onto said record member during traverse of said carriage member in front of said record member.

10. Apparatus according to claim 6 in which said stylus-moving means comprises a belt member and a stylus carriage on said belt member; a stretch of said belt lying in a predetermined path across said record member, and said stylus projecting from one side of said carriage to said record member; said means for applying electric potential to said stylus comprising a brush on said carriage and a stationary segment parallel to said record member, said brush being electrically connected to the stylus and projecting from the carriage on the side thereof opposite the stylus into contact with said segment, whereby the torque applied to the carriage by the force of the stylus against the record member is opposed by the force of the brush against said segment.

11. Apparatus according to claim 10 in which said stylus carriage comprises: a block of rubber-like material attached to the outer surface of said belt, and means mounting said stylus and brush element on said block, said mounting means comprising a pivot member extending parallel to the travel of the belt and supported by the block, a resilient hollow frame extending around said block and pivotally engaging the ends of said pivot member at opposite ends of said frame, said stylus and said brush element being secured to opposite sides of said frame.

12. Apparatus for echo distance signaling comprising: means including a switching mechanism for generating electric waves in response to actuation of said switching mechanism; means for transmitting traveling waves in response to generation of said electric waves; means for receiving traveling waves and generating an electric potential in response thereto; indicating means including a device movable through a predetermined path and responsive to said electric potential for producing a visible indication of the position of said device at the time of application of said potential thereto; supporting and moving means for recurrently traversing said device through said path independently of received waves; a driving motor for said supporting and moving means, and friction drive means coupling said motor to said supporting and moving means; means for applying electric potential generated in response to received traveling waves to said device during its traverse through said path to indicate the location of said device along said path at the time of reception of said traveling waves; said switching mechanism including an element on said supporting and moving means and cooperating means at a predetermined point in the path of said element for actuating said switching means in response to contact of said element with said cooperating means.

13. Apparatus of the type described comprising, in combination: means including a control circuit for generating electric waves in response to closure of said control circuit; means for transmitting travelling waves in response to generation of said electric waves; means for receiving travelling waves and generating an electric potential in response thereto; a member to be recorded upon; a stylus, and stylus-moving means for recurrently traversing said stylus independently of received waves; means for applying the electric potential generated in response to received travelling waves to said stylus for producing an indication on said record member of the position of the stylus in its traverse at the time of reception of said travelling waves; and switching means comprising a brush element on said stylus-moving means and first and second adjacent switch segments in the path of said brush element over which said brush element successively rides for closing said control circuit in response to contact of said brush element with said first and second switch segments, said brush element being of such configuration as to momentarily interconnect said segments during its passage from the first to the second, and said segments being connected in series in said control circuit, the length of the second segment being approximately equal to the width of said record member and being so positioned as to be traversed by said brush element while said stylus is traversing said record member; said stylus and brush element being electrically interconnected and said second segment being connected to said means for generating electric potential in response to received travelling waves.

HAMILTON A. STAMPER.
DONALD O. NELSON.
JAMES A. WIPPERT.

REFERENCES CITED

The following references are of record in the file of this patent:

UNITED STATES PATENTS

| Number | Name | Date |
|---|---|---|
| 1,847,243 | Hayes | Mar. 1, 1932 |
| 1,858,931 | Langevin et al. | May 17, 1932 |
| 2,170,505 | Peters | Aug. 20, 1939 |
| 2,201,943 | Dallin | May 21, 1940 |
| 2,232,589 | Chappell et al. | Feb. 18, 1941 |
| 2,370,134 | Begun | Feb. 27, 1945 |
| 2,384,722 | Blain | Sept. 11, 1945 |
| 2,412,234 | Turner, Jr. | Dec. 10, 1946 |
| 2,418,490 | Turner, Jr. | Apr. 8, 1947 |
| 2,437,242 | Cole et al. | Mar. 9, 1948 |
| 2,443,647 | Waterman | June 22, 1948 |
| 2,463,328 | Sproule | Mar. 1, 1949 |
| 2,467,202 | Gardiner | Apr. 12, 1949 |
| 2,491,020 | Winchel | Dec. 13, 1949 |